US011985744B2

(12) United States Patent
Bras et al.

(10) Patent No.: US 11,985,744 B2
(45) Date of Patent: May 14, 2024

(54) LED DRIVER SUITABLE FOR LOW-VOLTAGE OPERATION AND METHOD THEREFOR

(71) Applicant: SEMICONDUCTOR COMPONENTS INDUSTRIES, LLC, Phoenix, AZ (US)

(72) Inventors: Sebastien Bras, Rabastens (FR); Jan Plojhar, Mokra Horakov (CZ)

(73) Assignee: SEMICONDUCTOR COMPONENTS INDUSTRIES, LLC

( * ) Notice: Subject to any disclaimer, the term of this patent is extended or adjusted under 35 U.S.C. 154(b) by 45 days.

(21) Appl. No.: 17/813,405

(22) Filed: Jul. 19, 2022

(65) Prior Publication Data

US 2024/0032173 A1 Jan. 25, 2024

(51) Int. Cl.

| | |
|---|---|
| ***H05B 45/375*** | (2020.01) |
| ***H05B 45/14*** | (2020.01) |
| ***H05B 45/44*** | (2020.01) |

(52) U.S. Cl.

CPC ........... *H05B 45/375* (2020.01); *H05B 45/14* (2020.01); *H05B 45/44* (2020.01)

(58) Field of Classification Search

CPC ...... H05B 45/375; H05B 45/14; H05B 45/44; H05B 45/54

See application file for complete search history.

(56) References Cited

U.S. PATENT DOCUMENTS

| | | | | |
|---|---|---|---|---|
| 2006/0119329 A1* | 6/2006 | Jacobs | H03K 17/133 | 323/234 |
| 2006/0132111 A1* | 6/2006 | Jacobs | G05F 1/618 | 323/282 |
| 2011/0068701 A1* | 3/2011 | van de Ven | H05B 45/48 | 315/309 |
| 2013/0293379 A1* | 11/2013 | Rains, Jr. | H05B 47/11 | 340/541 |
| 2020/0274445 A1* | 8/2020 | Mei | H03K 5/24 | |

FOREIGN PATENT DOCUMENTS

| | | |
|---|---|---|
| FR | 3020122 A1 | 10/2015 |
| WO | WO-2017066496 A1 * | 4/2017 |

OTHER PUBLICATIONS

Infineon, "TLD5190, H-Bridge DC/DC Controller," rev. 1.2, Mar. 21, 2021.

* cited by examiner

*Primary Examiner* — Abdullah A Riyami
*Assistant Examiner* — Syed M Kaiser
(74) *Attorney, Agent, or Firm* — Polansky & Associates, P.L.L.C.; Paul J. Polansky

(57) ABSTRACT

In one form, a switching controller includes a buck controller and a bypass circuit. The buck controller has an input for receiving a variable voltage, an output for providing a buck voltage by switching the variable voltage into an inductive output filter according to a switching signal having a variable duty cycle to regulate a current into a load. The bypass circuit is coupled to the buck controller for comparing the variable duty cycle of the switching signal to a threshold, for activating a bypass signal in response to the variable duty cycle exceeding the threshold, and for subsequently deactivating the bypass signal according to a predetermined algorithm.

19 Claims, 4 Drawing Sheets

LED DRIVER SUITABLE FOR LOW-VOLTAGE OPERATION AND METHOD THEREFOR

FIELD OF THE DISCLOSURE

This disclosure relates generally to driver circuits, and more specifically to light-emitting diode (LED) driver circuits.

BACKGROUND

LEDs are commonly used in various modern electronic products, such as automotive headlights. An LED driver is a circuit that regulates a variable battery voltage in order to provide a constant current through an LED string in order to maintain the intensity of the light as the power supply voltage varies. LED drivers are commonly implemented with step-down or "buck" switching converters using current regulation.

However, most of these buck converters assume that the voltage provided by the car battery will be sufficient to drive the LED string. Sometimes the battery voltage drops significantly, such as during the "cold cranking period" while the car engine is being started. In these situations, the battery voltage drops significantly, and a buck converter may not be able to generate a sufficient amount of current to preserve the light at the desired intensity. If the voltage drop is great enough, the buck converter may not be able to forward bias the LEDs at all.

There are a couple of know solutions to this problem. According to one such solution, some of the diodes in the diode string are bypassed, allowing the buck converter to sufficiently bias the remaining LEDs. However, this solution lacks flexibility and is unable to account for variation of the forward voltage (VF) of the diodes in the string. The second solution is to use a buck-boost converter to boost the battery voltage when it falls too low. While this solution maintains full light output during the crank pulse, it is more expensive than the much-simpler buck converter, and would add significantly to overall headlamp assembly cost.

BRIEF DESCRIPTION OF THE DRAWINGS

The present disclosure may be better understood, and its numerous features and advantages made apparent to those skilled in the art by referencing the accompanying drawings, in which:

FIG. 2 illustrates a timing diagram of signals useful in understanding a second technique for operating the LED circuit of FIG. 1 in low-voltage conditions;

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
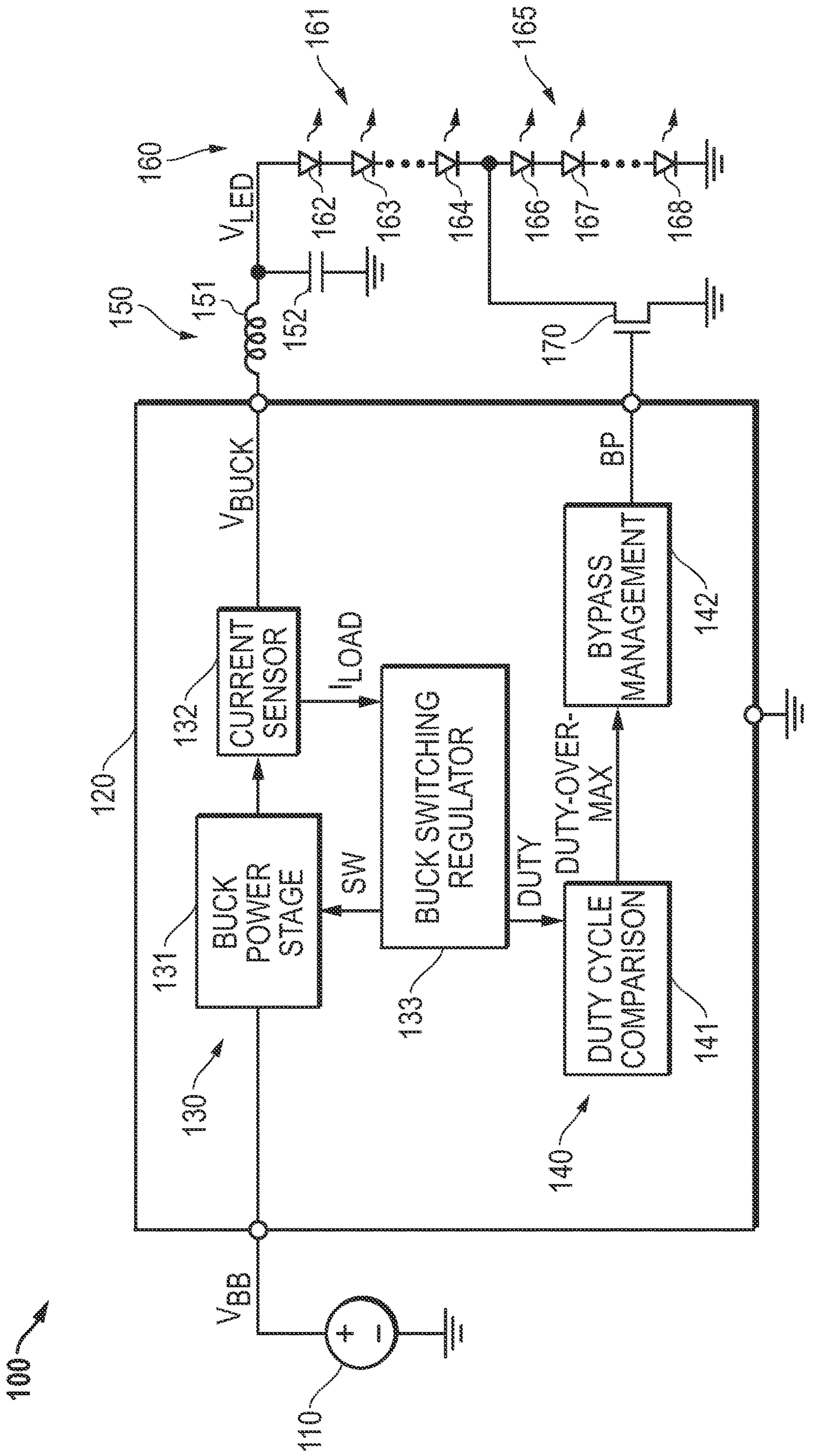
FIG. 1 illustrates in partial block diagram and partial schematic form a light-emitting diode (LED) circuit according to various embodiments described herein.

FIG. 1 illustrates in partial block diagram and partial schematic form a light-emitting diode (LED) circuit 100 according to various embodiments described herein. LED circuit 100 includes generally a voltage source 110, a switching controller 120, an output filter 150, an LED string 160, and a bypass switch 170.

Voltage source 110 is a constant (DC) voltage source having a positive terminal for providing a voltage labelled "$V_{BB}$", and a negative terminal connected to ground. In one embodiment, voltage source 110 is an automobile battery with a nominal voltage of 12.0 volts, but whose voltage varies significantly during operation of the automobile and over its useful lifetime.

Switching controller 120 has a first terminal connected to the positive terminal of voltage source 110, a second terminal connected to ground, an output terminal for providing an output voltage labelled "$V_{BUCK}$", and an output terminal for providing a bypass signal labelled "$V_{BP}$". Switching controller 120 includes generally a buck power stage 131, a current sensor 132, a switching regulator 133, and a bypass circuit 140. Buck power stage has a voltage input for receiving $V_{BB}$, a switching control input labelled "SW", and an output. Current sensor 132 has an input connected to the output of buck power stage 131, a first output for providing voltage $V_{BUCK}$, and a second output for providing a current sense signal labelled "$I_{LOAD}$". Buck switching regulator 133 has an input for receiving LOAD, a first output for providing SW, and a second output for providing a signal labelled "DUTY". Bypass circuit 140 includes a duty cycle comparison circuit 141, and a bypass management circuit 142. Duty cycle comparison circuit 141 has an input for receiving the DUTY signal, and an output for providing a signal labelled "DUTY_OVER_MAX". Bypass management circuit 142 has an input for receiving the DUTY_OVER_MAX signal, and an output for providing the BP signal.

Output filter 150 includes an inductor 151 and a capacitor 152. Inductor 151 has a first terminal for receiving $V_{BUCK}$, and a second terminal for providing a signal labelled "$V_{LED}$". Capacitor 152 has a first terminal connected to the second terminal of inductor 151, and a second terminal connected to ground.

LED string 160 includes a first set of LEDs 161, and a second set of LEDs 165. LEDs 161 include a set of series-connected LEDs, including representative LEDs 162, 163, and 164. LED 162 has an anode connected to the second terminal of inductor 151, and a cathode. LED 163 has an anode connected to the cathode of LED 162, and a cathode. LEDs 161 has a number of LEDs that in conjunction with LEDs 165 would be forward biased if $V_{BB}$ were equal to its nominal voltage. LED 164 is a last LED in first set of LEDs 161, and has an anode connected to the cathode of a previous LED, and a cathode.

Similarly, LEDs 165 include one or more series-connected LEDs, including representative LEDs 166, 167, and 168. LED 166 has an anode connected to the cathode of LED 164, and a cathode. LED 167 has an anode connected to the cathode of LED 166, and a cathode. LED 165 also has a number of LEDs that in conjunction with first set of LEDs 161 would be forward biased if $V_{BB}$ were equal to the nominal voltage of $V_{BB}$. LED 168 is a last LED in second set of LEDs 165, and has an anode connected to the cathode of a previous LED, and a cathode connected to ground.

Bypass switch 170 is implemented as an N-channel metal-oxide-semiconductor (MOS) transistor having a drain connected to the cathode of LED 164 and to the anode of LED 166, a gate for receiving the BP signal, and a source connected to ground.

LED circuit 100 can be, for example, a headlamp system for an automobile. It regulates the highly variable voltage $V_{BB}$ into a lower voltage using a buck converter architecture. The buck converter uses current sensor 132 to measure the current input through LED string 160 and regulate the switching of buck power stage 131 to regulate the current through LED string 160 to an amount that provides a desired brightness.

Occasionally, $V_{BB}$ falls too low to properly drive the LED string 160. For example, during the engine startup period known as the cold cranking period, a car battery can suffer a prolonged voltage drop. However, instead of letting all the diodes in LED string 160 fall below their cut-in voltages and the headlamp dimming significantly or entirely, switching controller 120 implements a bypass system in which a portion of the LEDs are bypassed in order to maintain the light output close to the desired intensity. Switching regulator 133 reports the current duty cycle of buck power stage 131 to bypass circuit 140 through the DUTY signal. Duty cycle comparison circuit 141 compares the DUTY signal to a threshold, and in response to detecting that the DUTY signal exceeds the threshold, it activates the DUTY_OVER_MAX signal to bypass management circuit 142. Bypass management circuit 142 then activates the BP signal at a logic high, closing the switch by making bypass switch 170 conductive to connect the cathode of LED 164 to ground and effectively bypass the LEDs in second set of LEDs 165. Thus, only LEDs 161 are forward biased, allowing light to be continuously generated through a subset of the LEDs in LED string 160.

Bypass management circuit 142 not only controls entry into the bypass mode, it also controls the exit from bypass mode, for example after the end of the cold cranking period. In various embodiments, switching controller 120 implements one of two techniques that ensure constant maintenance of light output without causing flickering. These techniques will now be explained in detail.

Figure 2:
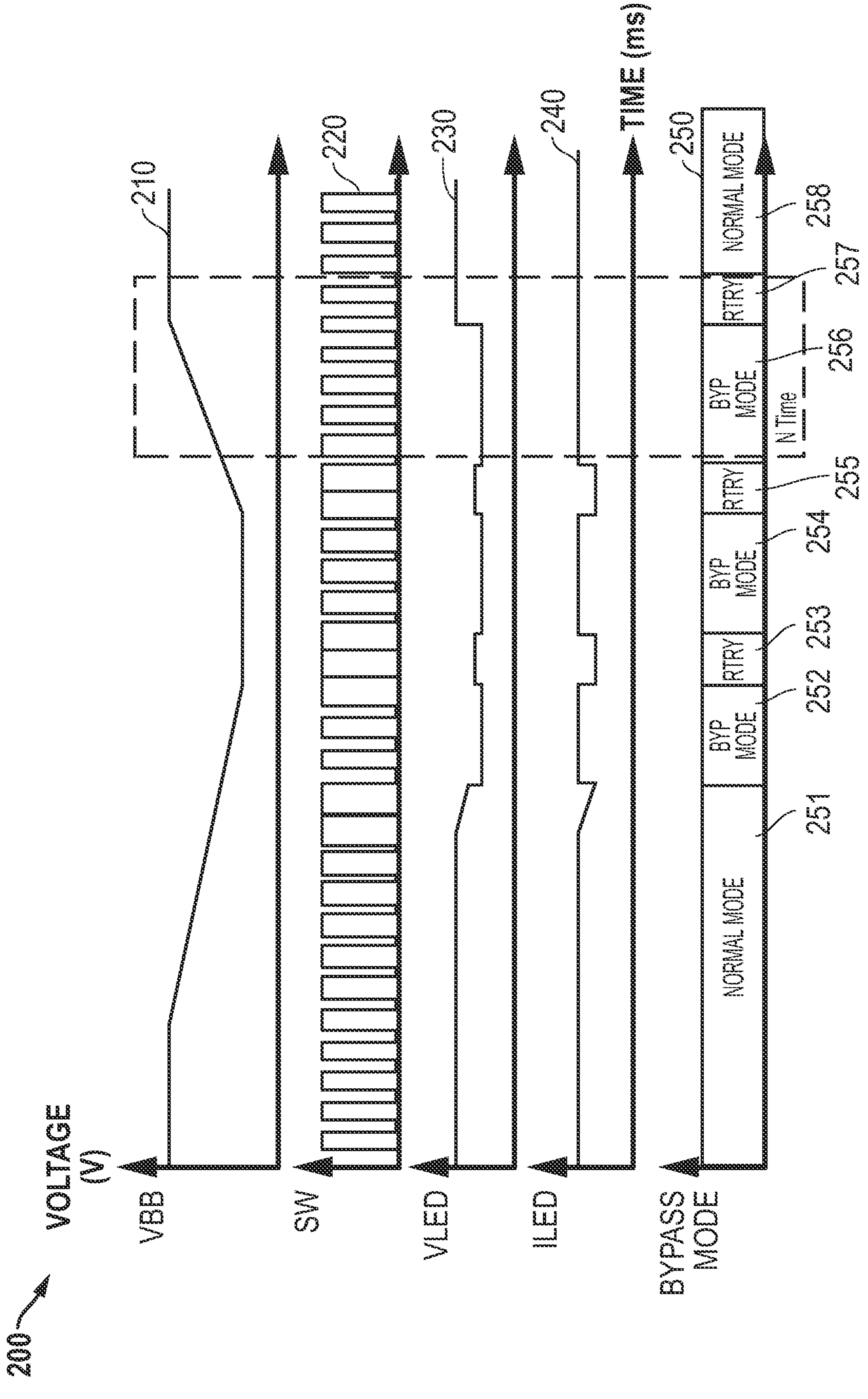
FIG. 2 illustrates a timing diagram of signals useful in understanding a first technique for operating the LED circuit of FIG. 1 from bypass mode.

FIG. 2 illustrates a timing diagram 200 of signals useful in understanding a first technique for releasing LED circuit 100 of FIG. 1 from bypass mode. The first technique is known as the retries technique. In timing diagram 200, the horizontal axes represent time in milliseconds (ms), and the vertical axes represents the voltage of various signals in volts (V). Timing diagram 200 shows waveforms of four signals of interest, including a waveform 210 showing battery voltage $V_{BB}$, a waveform 220 showing switch voltage SW, a waveform 230 showing $V_{LED}$, and a waveform 240 showing the current through LED string 160 labelled "$I_{LED}$". Timing diagram 200 shows the retries technique as eight sequential time periods 251-258, each indicating the mode that corresponds to the signals above it.

Figure 3:
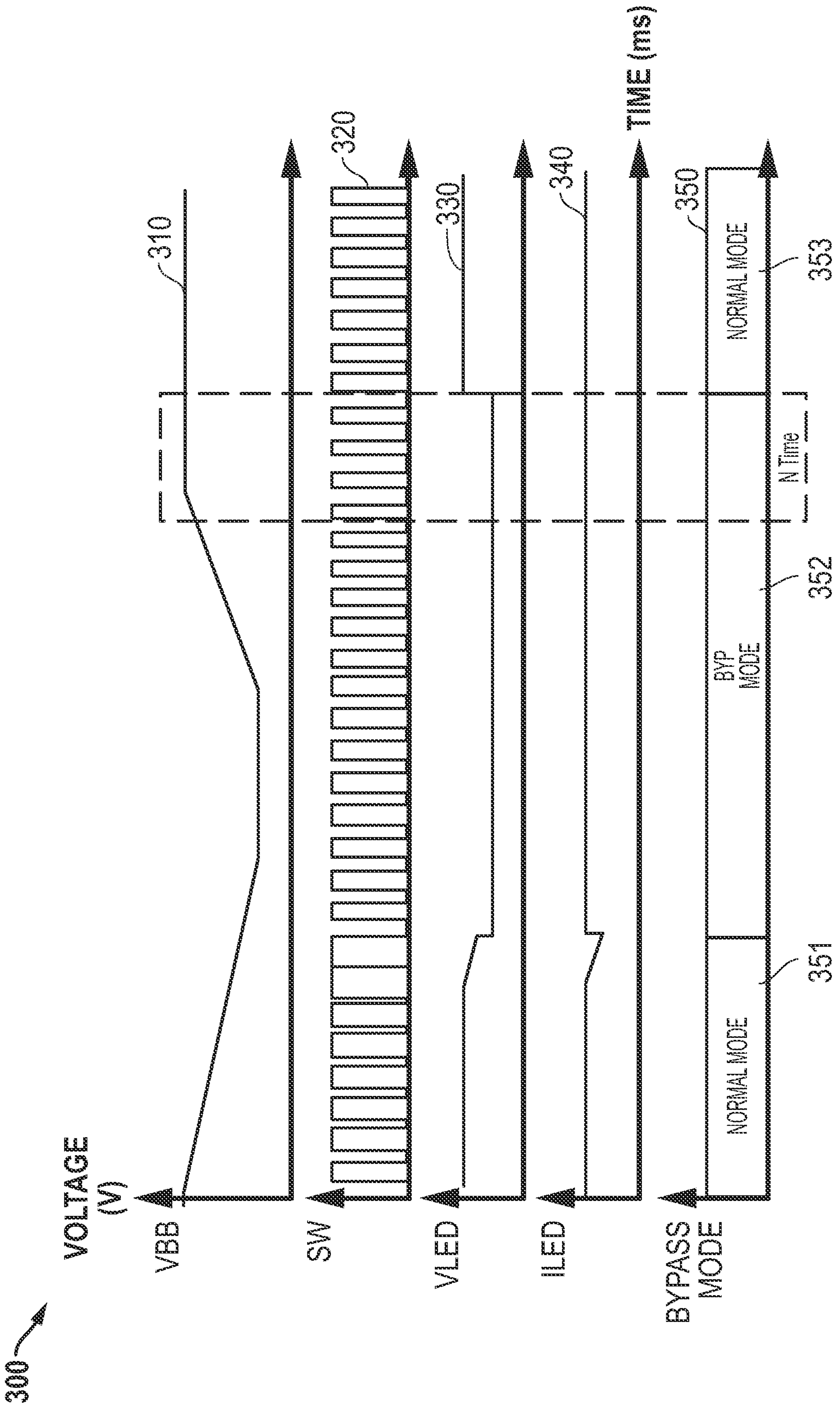
FIG. 3 illustrates a timing diagram of signals useful in understanding a second technique for releasing the LED circuit of FIG. 1 from BYPASS mode.

Switching controller 120 starts out in NORMAL mode during time period 251. While in NORMAL mode, switching controller 120 varies the duty cycle of the SW signal to regulate the current through LED string 160 to a desired level. As shown in FIG. 3, during time period 251, $V_{BB}$ starts to drop, such as at the start of a cold cranking period. The duty cycle of the SW signal increases throughout this period in an attempt to keep $I_{LOAD}$ regulated. Eventually, $V_{LED}$ and $I_{LED}$ start to drop as the buck converter cannot compensate for the reduced $V_{BB}$. They continue to decrease until duty cycle comparison circuit 141 detects that the DUTY signal exceeds the threshold. It activates the DUTY_OVER_MAX and in response, bypass management circuit 142 activates the BP signal, making bypass switch 170 conductive, and starting time period 252 in which LED circuit 100 is in the BYPASS mode.

During time period 252, the duty cycle of SW quickly drops. $V_{LED}$ decreases since fewer forward-biased LEDs are active, but $I_{LED}$ returns to its regulated level. However, since $V_{BB}$ continues to drop, the duty cycle of SW starts to increase.

According to the retries technique, bypass management circuit 142 periodically, e.g., after a certain time on the scale of milliseconds, reconnects all LEDs in LED string 160 by de-activating the BP signal, resulting in time period 253, in which switching controller 120 is in the RETRY mode. Since $V_{BB}$ is lower than at the start of time period 252, however, switching regulator 133 is again unable to keep LOAD in regulation, and the duty cycle of SW quickly exceeds the threshold. Bypass management circuit 142 re-activates the BP signal at a logic high, closing bypass switch 170 and making bypass switch 170 conductive, starting time period 254 in which switching controller 120 is again in the BYPASS mode.

This alternative process of operating in the BYPASS mode and attempting to operate in the RETRY mode continues for an indeterminate number of times shown as N times in timing diagram 200. Eventually, however, the cold cranking period comes to an end, and $V_{BB}$ starts to rise. Thus, as shown in timing diagram 200, during a time period 257 in the RETRY mode, the duty cycle does not exceed the threshold for a debounce period, and switching controller 120 returns to the NORMAL mode in time period 258. Time period 258 continues indefinitely until another significant drop in $V_{BB}$ occurs.

The retries technique has the advantage that it is easy to implement, requiring only a maximum duty cycle detector and a timer. N can have a value in the range of 100 or higher to avoid potential flickering in case of battery voltage fluctuation.

FIG. 3 illustrates a timing diagram 300 of signals useful in understanding a second technique for releasing LED circuit 100 of FIG. 1 from BYPASS mode. The second technique is known as the continuous duty cycle monitoring technique. In timing diagram 300, the horizontal axes represent time in ms), and the vertical axes represents the voltage of various signals in V. Timing diagram 300 shows waveforms of four signals of interest, including a waveform 310 showing battery voltage $V_{BB}$, a waveform 320 showing switch voltage SW, a waveform 330 showing $V_{LED}$, and a waveform 340 showing the current through LED string 160 labelled "$I_{LED}$". Timing diagram 300 shows the continuous duty cycle monitoring technique as three sequential time periods 351-353, each indicating the mode that corresponds to the signals above it.

LED circuit 100 starts out in NORMAL mode during time period 351. While in NORMAL mode, switching controller 120 varies the duty cycle of the SW signal to regulate the current through LED string 160 to a desired level. As shown in FIG. 3, during time period 351, $V_{BB}$ starts to drop, such as at the start of a cold cranking period. The duty cycle of the SW signal increases throughout this period in an attempt to keep $I_{LOAD}$ regulated. Eventually, $V_{LED}$ and $I_{LED}$ start to drop as the buck converter cannot compensate for the reduced $V_{BB}$. They continue to decrease until duty cycle comparison circuit 141 detects that the DUTY signal exceeds the threshold. It activates the DUTY_OVER_MAX and in response, bypass management circuit 142 activates the BP signal, making bypass switch 170 conductive, and starting time period 352 in which LED circuit 100 is in the BYPASS mode.

Unlike the retries mode, however, bypass management circuit 142 continuously monitors the DUTY_OVER_MAX signal. As shown in timing diagram 300, LED circuit 100 stays in the BYPASS mode for an extended period of time. Just after entry into the BYPASS mode, bypass circuit 140 stores the current value of the DUTY signal, designated "DCBypass". When in BYPASS mode, the duty cycle increases while $V_{BB}$ continues to drop. As shown in timing diagram 300, eventually $V_{BB}$ stabilizes at a certain value below its nominal value, and the duty cycle of the SW signal stops increasing. Eventually, $V_{BB}$ starts to rise as the cold cranking period is ending, and the duty cycle of the SW signal starts to decrease.

Bypass circuit 140 keeps the BP signal active until the DUTY signal drops below the DCBypass amount for more than a debounce period. This condition indicates that $V_{BB}$ has risen to a level that caused it to enter the BYPASS mode in the first place. It then enters NORMAL mode in time period 353.

The continuous duty cycle monitoring technique has the advantage that it doesn't require retries and therefore is flicker-less. However it requires some circuit complexity because of the need for a precise duty cycle measurement at an appropriate time period just after it enters bypass mode.

Figure 4:
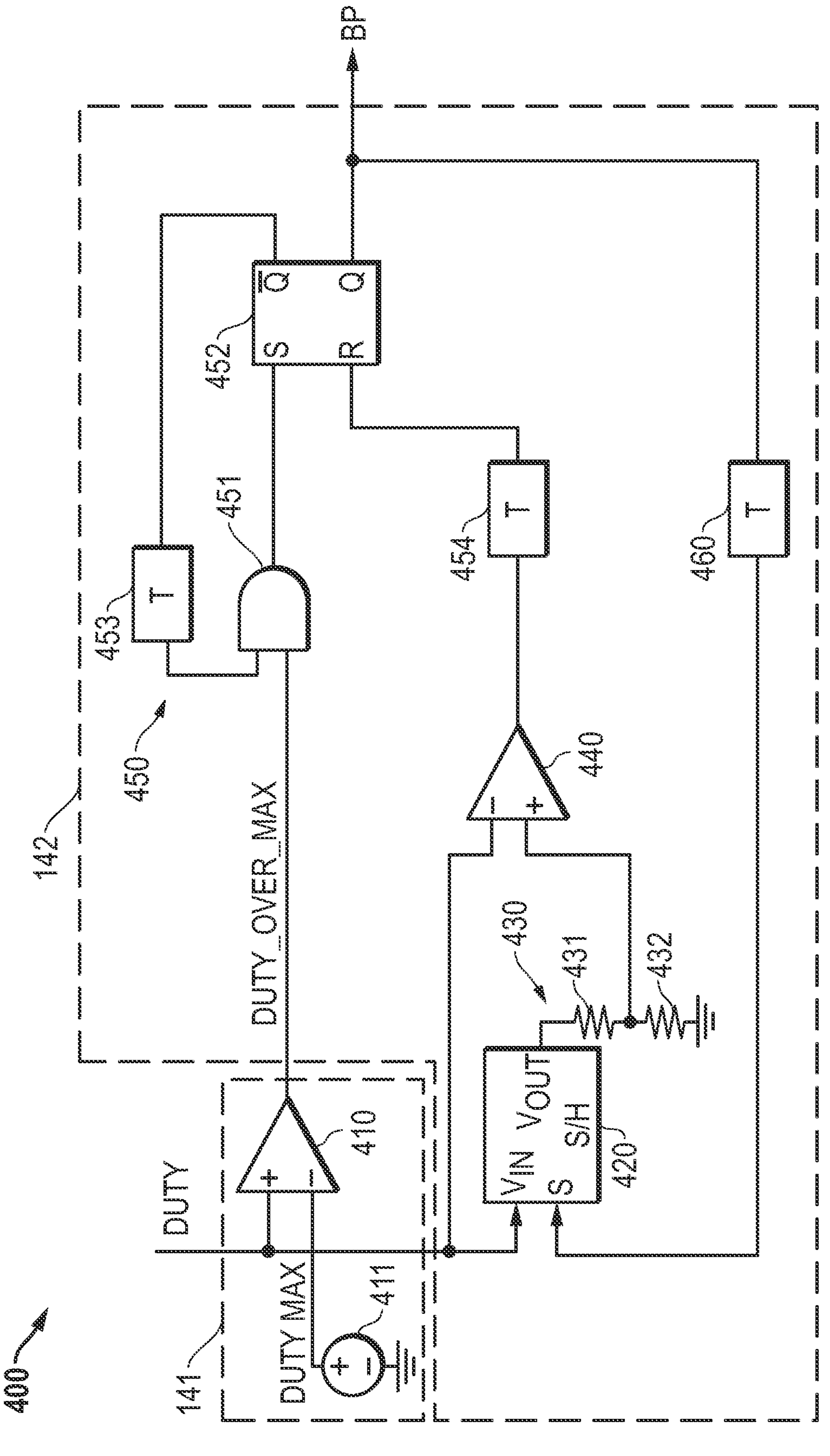
FIG. 4 illustrates in partial block diagram and partial schematic form a bypass circuit that can be used as the bypass circuit of FIG. 1 according to various embodiments disclosed herein.

FIG. 4 illustrates in partial block diagram and partial schematic form a bypass circuit 400 that can be used as bypass circuit 140 of FIG. 1 according to various embodiments disclosed herein. Bypass circuit 400 includes a duty cycle comparison circuit 141 and a bypass management circuit 142, both shown as dashed boxes.

Duty cycle comparison circuit 141 includes a comparator 410 and a voltage source 411. Comparator 410 has a positive input for receiving the DUTY signal, a negative input for receiving a voltage labelled "DUTYMAX", and an output for providing the DUTY_OVER_MAX signal. Voltage source 411 has a positive terminal for providing the DUTYMAX signal, and a negative terminal connected to ground.

Bypass management circuit 142 includes a sample-and-hold circuit 420, a resistor divider 430, a comparator 440, a bypass control state circuit 450, and a delay element 460. Sample-and-hold circuit 420 has a voltage input terminal labelled "VIN" for receiving the DUTY signal, a sample control input labelled "5", and an output terminal labelled "$V_{OUT}$". Resistor divider 430 includes resistors 431 and 432. Resistor 431 has a first terminal connected to the output terminal of sample and hold circuit 420, and a second terminal. Resistor 432 has a first terminal connected to the second terminal of resistor 431, and a second terminal connected to ground. Comparator 440 has a positive input connected to the second terminal of resistor 431, a negative input for receiving the DUTY signal, and an output. Bypass control state circuit 450 includes an AND gate 451, a flip-flop 452, a delay element 453, and a delay element 454. AND gate 451 has a first input, a second input for receiving the DUTY_OVER_MAX signal, and an output. Flip-flop 452 is a set-reset flip-flop having a set input labelled "S" connected to the output of AND gate 451, a reset input labelled "R", a true output labelled "Q" for providing the BP signal, and a complement output labelled "Q". Delay element 453 has an input connected to the output of flip-flop 452, and an output connected to the first input of AND gate 451. Delay element 454 has an input connected to the output of comparator 440, and an output connected to the active-low R input of flip-flop 452. Delay element 460 has an input connected to the Q output of flip-flop 452, and an output connected to the S input of sample and hold circuit 420.

Bypass circuit 400 is an implementation of bypass circuit 140 of FIG. 1 that uses the continuous duty cycle monitoring technique. Bypass circuit 400 enters BYPASS mode as follows. Assume that bypass circuit 400 has been in the NORMAL mode with signal BP inactive at a logic low. The Q output of flip-flop 452 is low, and the $\overline{Q}$ output of flip-flop 452 is high. The logic high at the input of delay element 453 has been high for a sufficient amount of time to propagate to its output, placing a "1" on the first input of AND gate 451. Comparator 410 continuously compares the value of the DUTY signal to the DUTYMAX signal. In response to a drop in $V_{BB}$, it provides the DUTY_OVER_MAX signal at a logic high in response to DUTY exceeding DUTYMAX. The two logic high levels on the inputs of AND gate 451 causes AND gate 451 to output a logic high as well to the S input of flip-flop 452, setting flip-flop in response. Bypass circuit 400 remains in the bypass mode until it is reset.

Bypass circuit 400 implements the continuous duty cycle monitoring technique for exiting BYPASS mode as follows. When the BP signal at the Q output of flip-flop 452 goes high, it closes bypass switch 170 by making the N-channel MOS transistor conductive and connects only the LEDs 161, bypassing LEDs 165. Delay element 460 ensures that a sufficient time has passed so that switching regulator 133 is switching only LEDs 161. The output of delay element goes high to activate the edge-triggered sample input of sample-and-hold circuit 420, causing the instantaneous value of the DUTY signal to be captured by sample-and-hold circuit 420 and provided to its output. Resistor divider 430 divides the sampled value according to sizes of resistors 431 and 432. This divided voltage is a large fraction of $V_{OUT}$, such as 97%, to implement hysteresis. Then when DUTY falls below this value, comparator 440 activates its output, and after a delay period caused by delay element 454, actives the reset input of flip-flop 452, resetting is an returning the BP signal to a logic low. In this manner, bypass circuit 400 determines that $V_{BB}$ has again risen to a level that indicates the low-voltage period, such as the cold cranking period.

It should be apparent that bypass circuit 400 is just one possible implementation of bypass circuit 140 that implements the continuous duty cycle monitoring technique for exiting bypass mode, and many other circuits implementations are possible.

The above-disclosed subject matter is to be considered illustrative, and not restrictive, and the appended claims are intended to cover all such modifications, enhancements, and other embodiments that fall within the scope of the claims. For example, there are various ways of implementing the bypass circuit for the retries technique and the continuous duty cycle monitoring technique. In various embodiments, different numbers of LEDs can be bypassed during the BYPASS period. While these techniques were illustrated in the context of automobiles, they are applicable to other types of applications. Switching controller 120 can be implemented as a monolithic integrated circuit, or with one or more discrete components.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A switching controller, comprising:

a buck controller having an input for receiving a variable voltage, an output for providing a buck voltage by switching said variable voltage into an output filter according to a switching signal having a variable duty cycle to regulate a current into a load; and a bypass circuit coupled to said buck controller for comparing said variable duty cycle of said switching signal to a threshold, for activating a bypass signal in response to said variable duty cycle exceeding said threshold, and for subsequently de-activating said bypass signal according to a predetermined algorithm, wherein said bypass circuit comprises:

a duty cycle comparison circuit coupled to said buck controller for providing a duty_over_max signal in response to determining that said variable duty cycle is greater than said threshold; and a bypass management circuit for activating said bypass signal in response to said duty_over_max signal, and de-activating said bypass signal according to said predetermined algorithm.

2. The switching controller of claim 1, wherein said buck controller comprises:

a buck power stage having an input terminal for receiving a battery voltage, and an output terminal for providing said buck voltage, for alternately switching said input terminal to said output terminal and said output terminal to ground in response to said switching signal; and a switching regulator for providing said switching signal at a duty cycle determined in response to a feedback signal.

3. The switching controller of claim 2, wherein said buck controller further comprises:

a current sensor coupled to said output terminal of said buck power stage for measuring a current driven by said buck power stage into said output filter to provide a load current signal to said switching regulator as said feedback signal.

4. The switching controller of claim 1, wherein said predetermined algorithm comprises a periodic retry algorithm in which said bypass circuit temporarily releases said bypass signal at a periodic interval, and permanently releases said bypass signal if during a release period, said variable duty cycle remains less than said threshold.

5. The switching controller of claim 1, wherein said predetermined algorithm comprises a continuous duty cycle monitoring algorithm, in which said bypass circuit measures said variable duty cycle after asserting said bypass signal, and releases said bypass signal if a measured duty cycle is less than a bypass threshold.

6. The switching controller of claim 1, wherein said duty cycle comparison circuit comprises:

a voltage source providing a voltage representative of said threshold; and a comparator having a positive input for receiving a duty signal, a negative input for receiving said voltage representative of said threshold, and an output for providing said duty_over_max signal.

7. The switching controller of claim 1, wherein said bypass management circuit comprises:

a sample-and-hold circuit having a voltage input terminal for receiving a duty signal, a set terminal for receiving said bypass signal, and an output terminal;

a divider having an input coupled to said output of said sample-and-hold circuit, and an output for providing a bypass threshold signal in response to reducing a voltage at said output terminal of said sample-and-hold circuit by a predetermined proportion; and a comparator having a positive input coupled to said output of said divider, a negative input for receiving a duty cycle signal representative of said variable duty cycle, and an output; and a bypass control state circuit having an output for receiving said bypass signal, wherein said bypass control state circuit is set in response to said variable duty cycle exceeding said threshold, and reset in response to said output of said comparator.

8. The switching controller of claim 1, wherein said buck controller and said bypass circuit are combined into a single integrated circuit.

9. A light-emitting diode circuit, comprising:

a buck power stage having an input terminal for receiving a battery voltage, and an output terminal for providing a buck voltage, for alternately switching said input terminal to said output terminal and said output terminal to ground in response to a switching signal;

a switching regulator for providing said switching signal at a duty cycle determined in response to a feedback signal;

a duty cycle comparison circuit coupled to said switching regulator for providing a duty_over_max signal in response to determining that said duty cycle is greater than a threshold;

a bypass management circuit for activating a bypass signal in response to said duty_over_max signal, and de-activating said bypass signal according to a predetermined algorithm;

an output filter having a first terminal coupled to said output terminal of said buck power stage, and a second terminal for providing a load voltage;

a plurality of series coupled light-emitting diodes coupled between said second terminal of said output filter and ground, and having an intermediate terminal between first and second groups of said plurality of series coupled light-emitting diodes; and a bypass switch for coupling said intermediate terminal to ground when said bypass signal is active.

10. The light-emitting diode circuit of claim 9, further comprising:

a current sensor coupled to said output terminal of said buck power stage for measuring a current driven by said buck power stage into said output filter to provide a load current signal to said switching regulator as said feedback signal.

11. The light-emitting diode circuit of claim 9, wherein:

said switching regulator further receives a voltage across said plurality of series coupled light-emitting diodes as said feedback signal.

12. The light-emitting diode circuit of claim 9, wherein said output filter comprises:

an inductor having a first terminal coupled to said output terminal of said buck power stage, and a second terminal coupled to said first terminal of said plurality of series coupled light-emitting diodes; and a capacitor having a first terminal coupled to said second terminal of said inductor, and a second terminal coupled to ground.

13. The light-emitting diode circuit of claim 9, wherein said predetermined algorithm comprises a periodic retry algorithm in which said bypass signal is temporarily released at a periodic interval, and permanently released if during a release period, said duty cycle remains less than said threshold.

14. The light-emitting diode circuit of claim 9, wherein said predetermined algorithm comprises a continuous duty cycle monitoring algorithm, in which said bypass management circuit measures said duty cycle after asserting said bypass signal, and releases said bypass signal if a measured duty cycle is less than a bypass threshold.

15. A method of controlling an output voltage provided to a load using a switching controller, comprising:

receiving a variable voltage;

regulating said variable voltage for providing a buck voltage, said regulating comprising switching said variable voltage into an output filter according to a switching signal having a variable duty cycle to regulate a current into the load;

comparing said variable duty cycle of said switching signal to a threshold, and providing a duty_over_max signal in response to determining that said variable duty cycle is greater than said threshold;

activating a bypass signal in response to said duty_over_max signal; and subsequently de-activating said bypass signal according to a predetermined algorithm.

16. The method of claim 15, wherein the load comprises a plurality of series coupled light-emitting diodes, and activating said bypass signal comprises:

coupling an intermediate terminal between first and second groups of the plurality of series coupled light-emitting diodes to ground in response to activating said bypass signal.

17. The method of claim 15, wherein said regulating comprises:

sensing a current into the load; and changing said variable duty cycle in response to said sensing.

18. The method of claim 15, wherein subsequently de-activating said bypass signal according to said predetermined algorithm comprises:

temporarily releasing said bypass signal at a periodic interval; and permanently releasing said bypass signal if during a release period, said variable duty cycle remains less than said threshold.

19. The method of claim 15, wherein subsequently de-activating said bypass signal according to said predetermined algorithm comprises:

measuring said variable duty cycle after asserting said bypass signal; and releasing said bypass signal if a measured duty cycle is less than a bypass threshold.

* * * * *